May 7, 1957 W. I. CARLSON 2,791,330
MACHINE FOR HANDLING HUSKED GREEN CORN
Filed Feb. 1, 1954 9 Sheets-Sheet 1
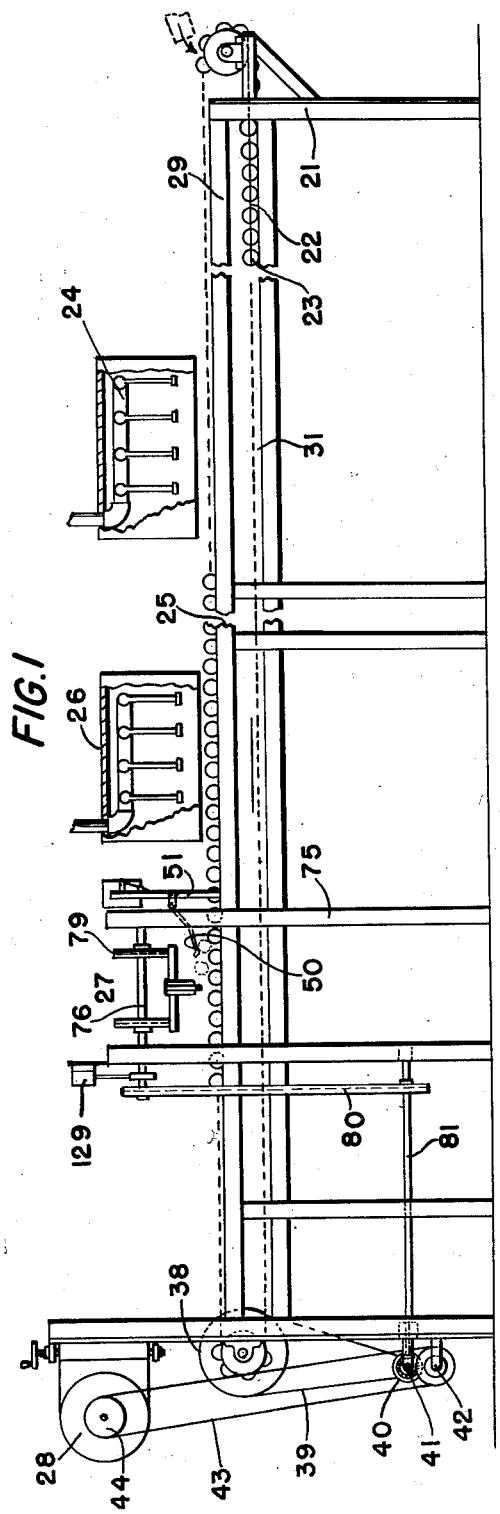
INVENTOR.
W. I. CARLSON
BY
Mason Porter Miller & Stewart
Attorneys

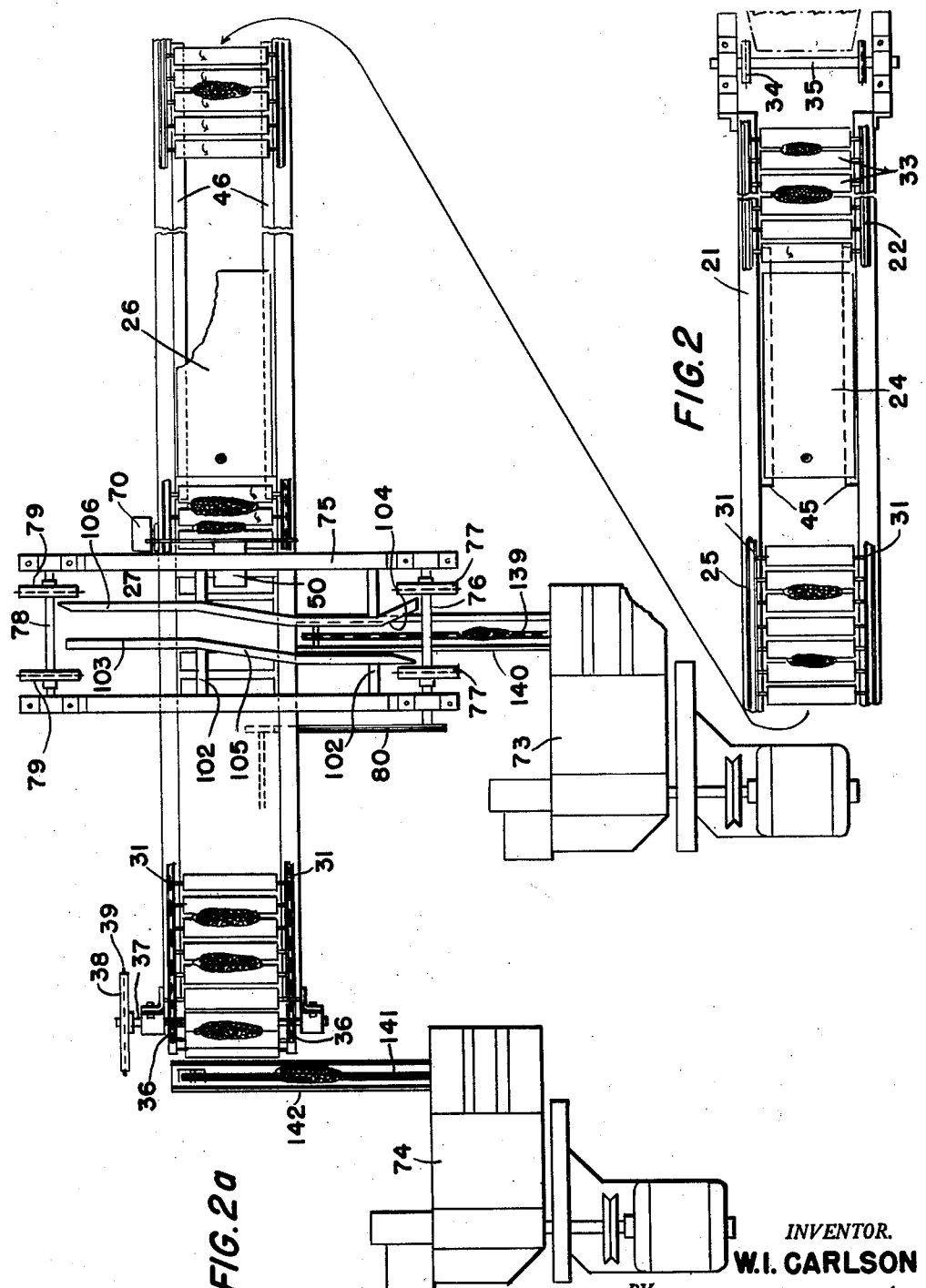

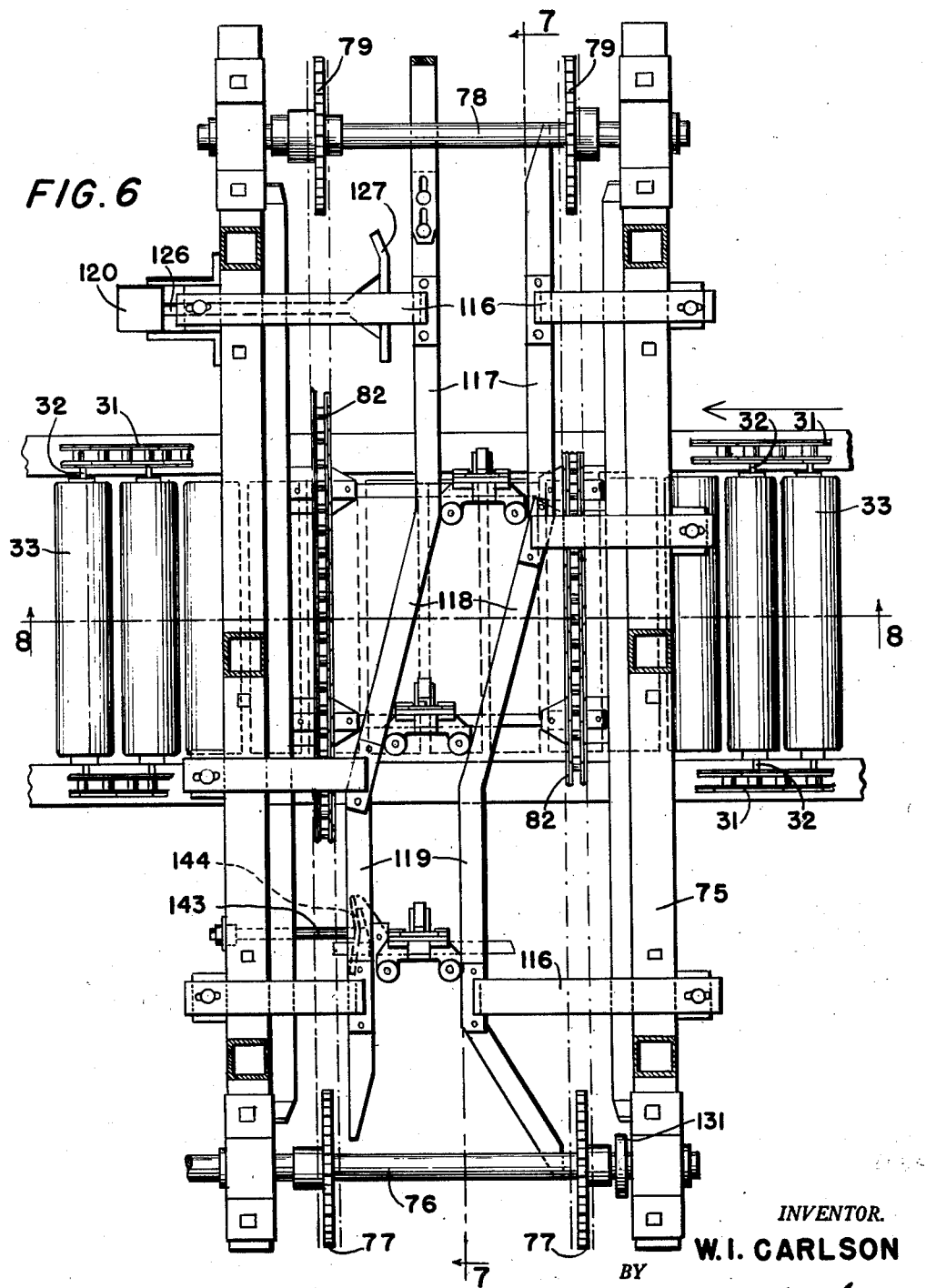

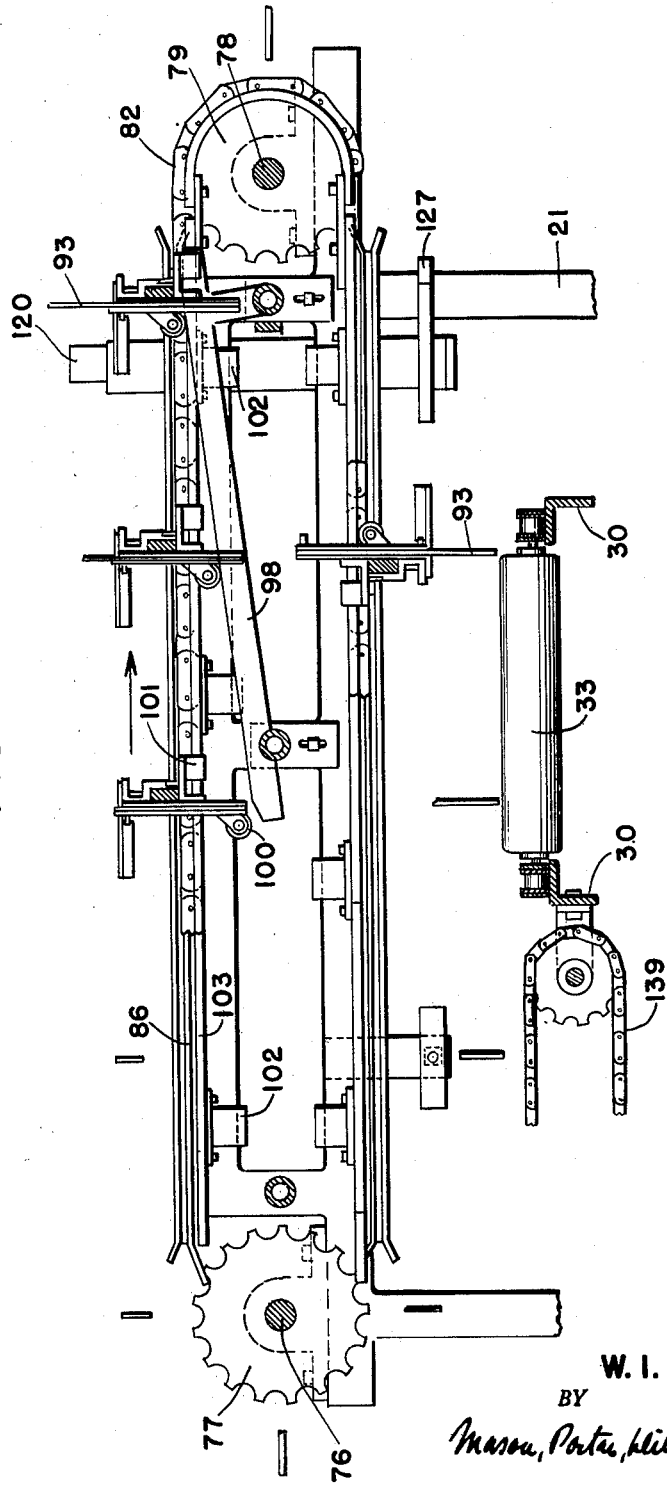

May 7, 1957 W. I. CARLSON 2,791,330
MACHINE FOR HANDLING HUSKED GREEN CORN
Filed Feb. 1, 1954 9 Sheets-Sheet 5

INVENTOR.
W. I. CARLSON
BY
attorneys

May 7, 1957 W. I. CARLSON 2,791,330
MACHINE FOR HANDLING HUSKED GREEN CORN
Filed Feb. 1, 1954 9 Sheets-Sheet 6

INVENTOR
W. I. CARLSON
BY
ATTORNEYS

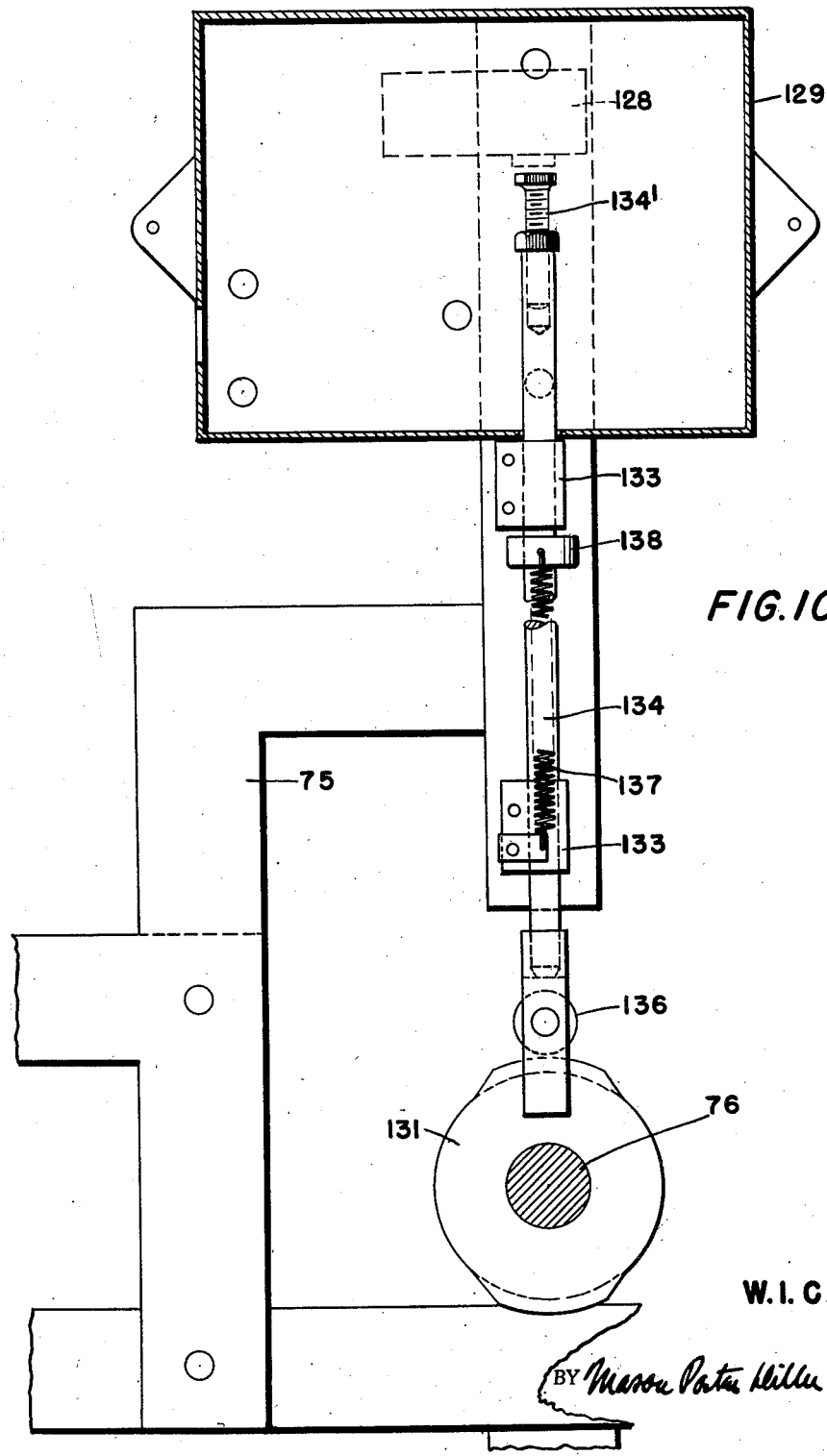

May 7, 1957 W. I. CARLSON 2,791,330
MACHINE FOR HANDLING HUSKED GREEN CORN
Filed Feb. 1, 1954 9 Sheets-Sheet 8

INVENTOR
W. I. CARLSON

ATTORNEYS

May 7, 1957 W. I. CARLSON 2,791,330
MACHINE FOR HANDLING HUSKED GREEN CORN
Filed Feb. 1, 1954 9 Sheets-Sheet 9
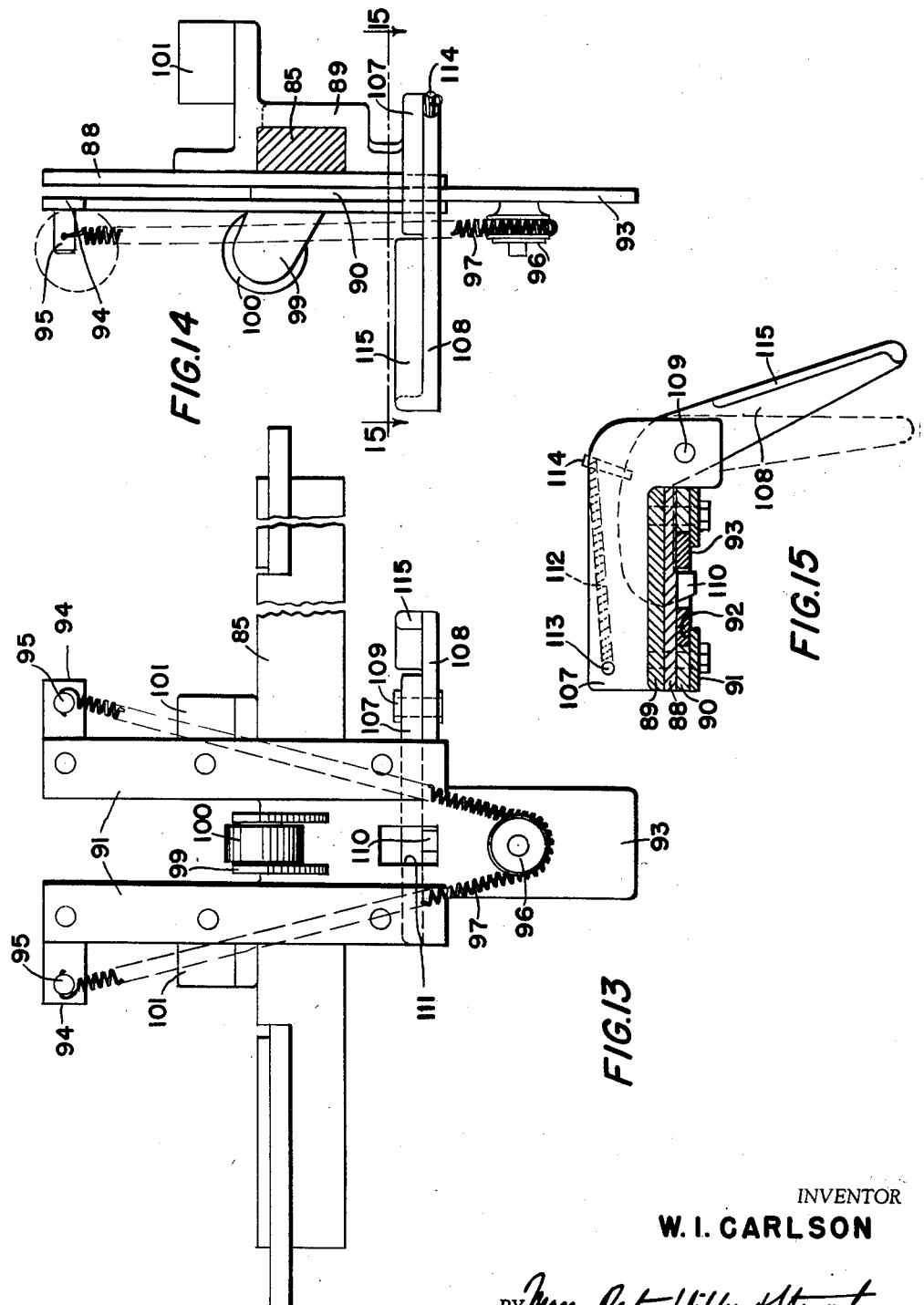
INVENTOR
W. I. CARLSON
BY
ATTORNEYS

United States Patent Office 2,791,330
Patented May 7, 1957

2,791,330
MACHINE FOR HANDLING HUSKED GREEN CORN

Wyman I. Carlson, Lewiston, N. Y., assignor to Green Giant Company, Le Sueur, Minn., a corporation of Minnesota Application February 1, 1954, Serial No. 407,238

5 Claims. (Cl. 209—88)

The following specification relates to an invention in machines for handling green corn including washing, visual inspection and culling, separation according to size, and delivery to cutting machines.

Ears of green corn intended for processing are first husked, then subjected to a series of operations and finally delivered to machines for cutting the immature kernels from the cobs. Handling large quantities of such material in several successive stages of operation is laborious, time consuming and in many instances injurious to the material by reason of rough handling and bruising.

This invention has been developed for the purpose of overcoming the disadvantages usually attendant to large scale handling of green corn as it is being prepared for processing.

Briefly the invention consists in providing mechanical facilities for the successive steps of operation, including a final grading of the ears according to size as they are advanced to the cutting machines.

One of the objects of this invention is to minimize the handling of husked green corn as it is being processed.

It is a further object of the invention to avoid rough handling which would cause damage, bruising and the like by conveyor belts, chutes and other mechanism.

It is a still further object of the invention to advance the ears of corn separately and individually for successive handling operations.

In carrying out the invention it is also a purpose to advance the individual ears without handling through successive steps of spray washing, visual inspection and assorting by size.

Incidental to the invention is the attainment of materially greater speed of operation and certainty of results in the successive steps.

In order to illustrate the invention, it has been shown in its preferred form in the accompanying drawings by way of example. In these drawings:

Fig. 1 is a side elevation of the complete machine;

Figs. 2 and 2a represent a plan view on an enlarged scale of the complete machine;

Fig. 3 is a longitudinal vertical section of the selecting mechanism taken on the line 3—3 of Fig. 4;

Fig. 4 is a transverse vertical section of the same taken on the line 4—4 of Fig. 3;

Fig. 5 is an elevation of the tripping mechanism shown in Fig. 4, the cover being removed;

Fig. 6 is a plan view of the mechanism for the transfer of over-size ears;

Fig. 7 is a vertical sectional view of the same on the line 7—7 of Fig. 6, transversely of the direction of travel;

Fig. 10 is a front elevation of same;

Fig. 13 is a front elevation of the slide on the traversing chain;

Fig. 14 is a side elevation of the same;

Fig. 15 is a horizontal cross-section on line 15—15 of Fig. 14; and

Figure 8:
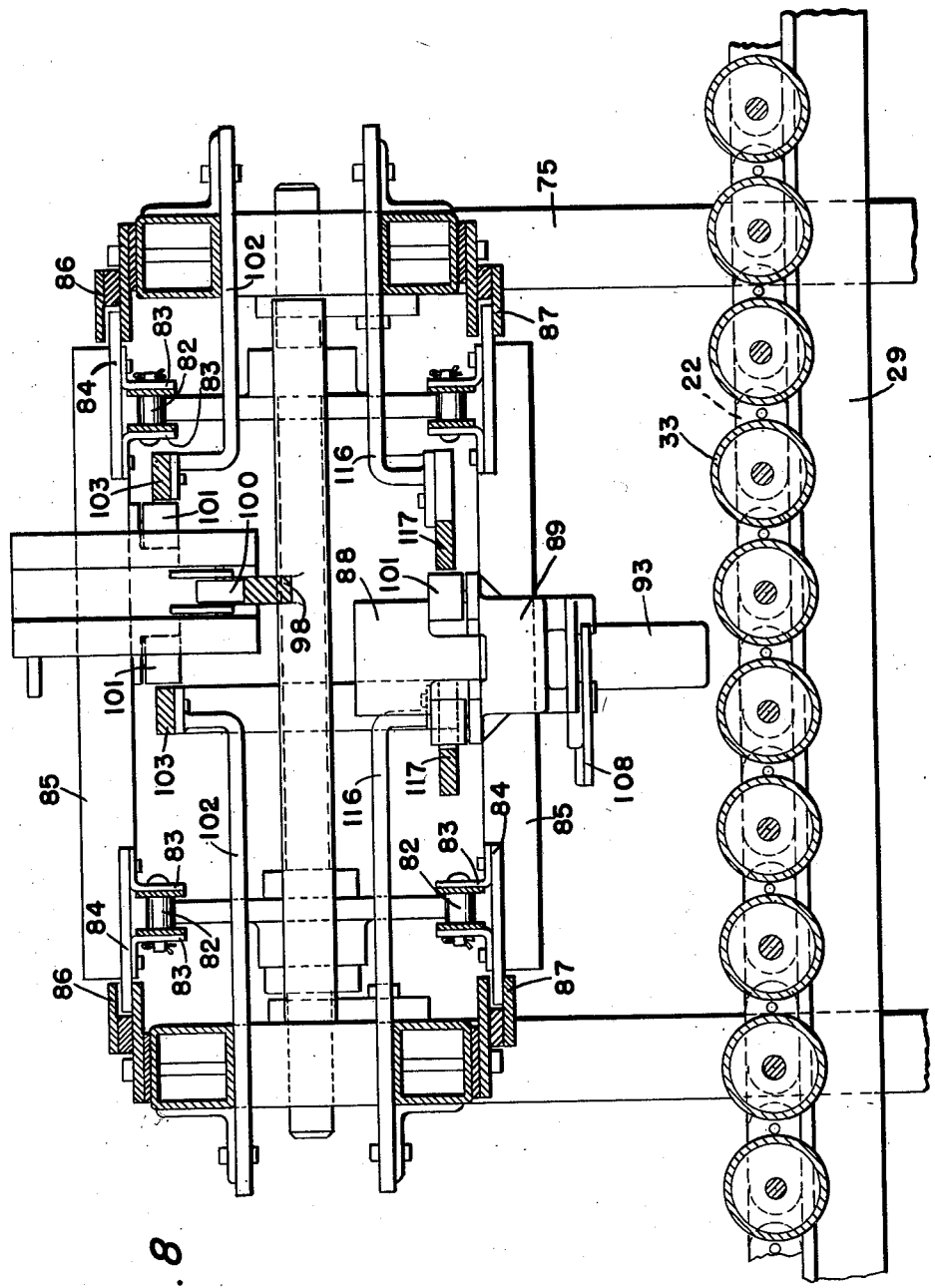
Fig. 8 is a vertical sectional view of the same on the line 8—8 of Fig. 6, longitudinally of the direction of travel.

Briefly considered, the invention consists in mechanical units correlated for simultaneous and continuous operation by which husked ears of corn may be received as a conglomerate mass and advanced one by one over a conveyor where each ear is individually spray-cleaned and rotated for inspection and culling. Finally, the individual ears are passed through a work station where their diameter is measured and they are sorted according to size.

In passing, it is to be remarked that the choicest ears are generally the smaller size. It is therefore desirable to segregate the ears of smaller diameter and to allow the oversize, more mature ears to be delivered separately for independent utilization.

For these purposes, the improved mechanism consists in an endless conveyor by which the individual ears are advanced through the spray-washing steps and given a slow rotary movement to expose all surfaces to visual inspection and manual culling. Ultimately, the ears are then gauged according to diameter and segregated accordingly. The smaller ears are diverted from the conveyor, while the larger ones are carried to a work station at the end of travel of the conveyor.

In the drawings I have shown a work table 21, along which an endless conveyor 22 travels. The ears of corn delivered in bulk on the upper course of the conveyor are separated and lie in the troughs between adjacent conveyor rollers 23 and are individually advanced beneath a sprayer 24. Beyond the sprayer the conveyor passes an inspecting station 25 where defective ears are removed manually.

The conveyor then carries the acceptable ears through a second sprayer 26 for a final rinse.

Finally the conveyor passes through a gauging and separating station 27.

The conveyor 22 and associated parts are operated by motive power, preferably by an electric motor 28.

The table 21 is provided with an upper runway formed by a pair of angle bars 30, 30.

An endless chain conveyor 22 has its upper flight on the track members of the runway, while the return flight is supported on the lower runway. The conveyor is formed of endless chains 31, 31. These chains have stub shafts 32, 32 extending inwardly and supporting intermediate rollers 33, 33. These rollers 33 are loose on the stub shafts 32. The rollers are of appropriate size, so that an individual ear of corn is supported in the trough between each pair of rollers.

The entrance end of the conveyor has its chains supported on sprockets 34 on idle shaft 35. At the opposite or foot end of the table, the chains 31 pass over drive sprockets 36 mounted on drive shaft 37. One end of the drive shaft 37 is extended as shown in Fig. 2a to carry a sprocket 38.

A chain 39 on sprocket 38 travels over a sprocket 40 on an intermediate shaft 41. This latter shaft is geared to countershaft 42, which in turn is connected by sprocket chain 43 with a sprocket 44 on the shaft of the motor 28.

The upper runway is provided with a pair of friction treads 45 under the first spray, as shown on Fig. 2. In this way the individual rollers 23 are caused to rotate as they progress. The ears of corn are consequently rotated during their travel under the spray.

The treads 45 end where the inspection area 25 begins. However, partly through this area friction treads 46 are provided so that the corn ears will rotate during the latter part of their travel through the inspection area.

This rotation is also provided during the travel under the second spray 26 by extending the treads 46 beyond the spray, as indicated on Fig. 2a.

Feeler or gauging mechanism is provided over the conveyor at the end of the second spraying area and as the conveyor takes the ears into the separating station 27. In Fig. 3, large ears are shown at 46 and 47 with an intermediate small ear 48. Ear 48 passes under the feeler plate 50 without contacting the latter or moving it vertically. The ear 46 is approaching the contact plate 50 and will elevate the plate 50. The ear 47 has passed the contact plate 50 and through it has set in motion the mechanism for diverting or separating the over-size ear 47. No actuation is caused during the passage of the normal or small ear.

The feeler equipment is assembled upon a subframe 51 shown in Figs. 3 and 4. The vertical side portions of the frame carry brackets 52, 52, in which are provided journals 53 for a rockshaft 54. This shaft is free to rock for a limited angular extent.

A sleeve 55 is loosely journaled on the shaft 54. A collar 56 rigid on rockshaft 54 is connected to sleeve 55 by means of a torsion spring 57.

On the opposite side of the rockshaft 54 from the contact plate 50 there is a fixed collar 58. This collar has a tongue 59 against which a shoulder 60 on the end of sleeve 55 strikes.

The contact plate 50 is held in its downward position by means of torsion spring 57. When, however, a large ear of corn is carried underneath the contact plate, it will raise the latter against the tension of the spring 57, and the shoulder 60 will move the tongue 59 and the rockshaft 54.

The rockshaft 54 has a lower lever 61 fixed thereon.

Above the rockshaft 54, the surframe 51 has a depending bracket 62. Journals 63, 63 mounted on one vertical side of the subframe, and on the bracket 62, carry an upper rockshaft 64.

The upper rockshaft has an upper lever 65 extending to the rear, parallel to the lower lever 61.

An adjustable stop 66 is mounted upon the cross-member of the subframe to limit the vertical movement of the upper lever 65.

The upper lever 65 is connected to the lower lever 61 by a pair of links 67, 67 having right and left hand treads over which an adjustable sleeve 68 is moved. A locknut 69 holds the sleeve and the links 67, 67 in position to give the desired distance between the levers 61 and 65.

The upper rockshaft 64 is extended beyond the side member of the subframe, as shown in Fig. 4. This extension goes into the switch box 70.

As shown in Fig. 5, the switch box contains a switch 71 having a plunger 72 and a pair of conductors 73.

A bracket 74 on the housing of the switch 71 serves as a pivot for a bell crank 75, having a roller 76. The extension of the rockshaft 64 carries a trip lever 77 which is rocked into engagement with the roller 76. A stop 78 on the switch box 70 limits the extent of travel of the lever 77 and consequently of the actuation of the switch-operating plunger 72.

The conveyor 22 is traversed at right angles by a conveying means which normally serves to push each ear of corn out of the trough between successive rollers 33 and deliver it regardless of size to conveying means leading to a corn cutting machine 73.

The feeler plate 50 serves to energize switch 71 and render the traversing mechanism inoperative to divert oversize ears. The latter are permitted to travel to the end of the endless conveyor where they are dropped upon conveying means leading to a second corn cutting machine 74. The latter is adapted to handle over-size ears while the corn cutting machine 73 is appropriately adjusted to operate upon ears of smaller or normal size.

The traversing mechanism is mounted on a cross frame 75 above the conveyor 22 and immediately beyond the contact plate 50. The cross frame carries at one end a drive shaft 76 suitably journaled on the frame. A pair of sprockets 77, 77 are fitted on the shaft 76. An idle shaft 78 is journaled at the opposite end of the cross frame. This idle shaft 78 carries a second pair of sprockets 79, 79. A chain conveyor connects sprockets 77 and 79.

Shaft 76 is driven by a chain 80 which in turn is driven from a shaft 81 connected to the miter gear 40.

A conveyor chain 82 connects one drive sprocket 77 with the corresponding sprocket 79 on the idle shaft 78.

Suitably spaced on chains 82 are a plurality of brackets 83. The brackets 83 are arranged in pairs and support plates 84, as shown in Fig. 8. The plates 84 on one chain 82 are connected to the similar plates on the opposite chain by means of cross bars 85.

The plates 84 extend outwardly and slide in tracks 86, 86, mounted on the cross frame 75 transversely of the direction of travel of the conveyor 22.

The cross frame 75 also carries two parallel tracks 87, 87 which receive and guide the plates 84 on their lower course, as shown in Fig. 8.

The cross bars 85 form sliding supports for pushing elements which travel with the cross bars 85 on both the upper and lower courses, as shown at Fig. 7.

These pusher devices include a front plate 88 held against the rear face of a cross bar 85 by means of a stirrup 89. Back of the front plate is a spacer 90 on each side and this in turn supports a rear face plate 91. The spacers 90 are set back from the inner edges of the rear plates 91, 91 to provide vertical tracks 92, as shown on Fig. 15.

A slide 93 is vertically movable in the tracks 92. The rear plates 91, 91 have outwardly projecting ears 94 at the top, each of which carries a pin 95. The slide 93 has a knob 96 on its lower face. A coil spring 97 has its ends attached to the pins 95 and its mid-portion passes around under knob 96. The slide 93 is accordingly held normally in its upper position. This corresponds to the inner position shown at the left in the upper course of Fig. 7.

In order to extend the slide 93 downwardly as shown in the lower course of Fig. 7 and as shown in Fig. 13, there is provided in the cross frame a ramp 98 (Fig. 7). This is located between the plates 91, 91. It is lowest at the point where the carriages approach the ramps, and highest at the point where the carriage leave. By means of this ramp 98, the slides 93 are set in the extended position, so that on the return or lower course they pass close above the rollers 33 (Figs. 7 and 8).

Cooperating with the ramp 98, each slide is provided at the end opposite the knob 96 with a bearing 99 carrying a roller 100.

The stirrup 89 carries a pair of spaced, depending rollers 101, 101.

The cross frame has a series of supporting arms 102, 102, each of which carries a guide 103. These guides are spaced sufficiently to permit the rollers 101 to be guided between them.

Referring to Fig. 2a it will be noted that the guides 103, 103, have a flaring entrance 104, with a backwardly inclined mid-section 105, and a straight section 106, where the carriages are discharged.

In order to hold the slide 93 in extended position (downward in Fig. 13), the stirrup at this point has an extension 107. A latch bar 108 is pivoted on pin 109 extending vertically in the extension 107. The latch proper 110 passes through an opening 111 in the slide 93 when the roller 100 has brought the slide to its outer (downward) position. This latched arrangement is shown in Figs. 13 and 15.

The latch bar 108 is held in latched position by means of a coil spring 112 anchored in the extension 107 by a pin 113 on the extension. The opposite end of the spring is connected to a peg 114 projecting from the latch bar 108.

The latch 110 is withdrawn from the hole 111 by inward movement of the bar 108. For this purpose the bar 108 has a shoe 115 which extends vertically and is the operating portion of the bar.

The carriages with their extended slides 93 are successively carried around sprocket 78 and into the lower course. In line with the lower course of the conveyor 82, there is a series of suspending arms 116 mounted on the subframe 75. These arms carry a pair of transverse shifting tracks 117, 117. The tracks are spaced apart sufficiently to receive the rollers 101, 101 of each carriage.

The first section of the tracks 117 is at right angles to the direction of travel of the conveyor 22. However, over this conveyor the tracks are inclined forwardly, as shown at 118, 118, so that each slide as it traverses the conveyor, will remain in position above the trough between successive rollers 33, 33.

The final section of the shifting tracks is again at a right angle to the line of travel, as shown at 119, 119.

It may be noted that the shifting of the carriages is such that they are delivered at the end of the lower course into an advanced position where they are opposite the entering section of the upper tracks 103. The backward inclination of the tracks 105 brings the carriages opposite the entering section 117 of the lower shifting tracks.

The above arrangement of devices will cause a carriage to traverse the main conveyor 22 between each pair of rollers 33, 33 and to push an ear of corn laterally across the conveyor ahead of the traversing slide 93. This will completely unload the conveyor 22, as the slides in the extended position will remove both normal size ears and over-size ears.

Figure 12:
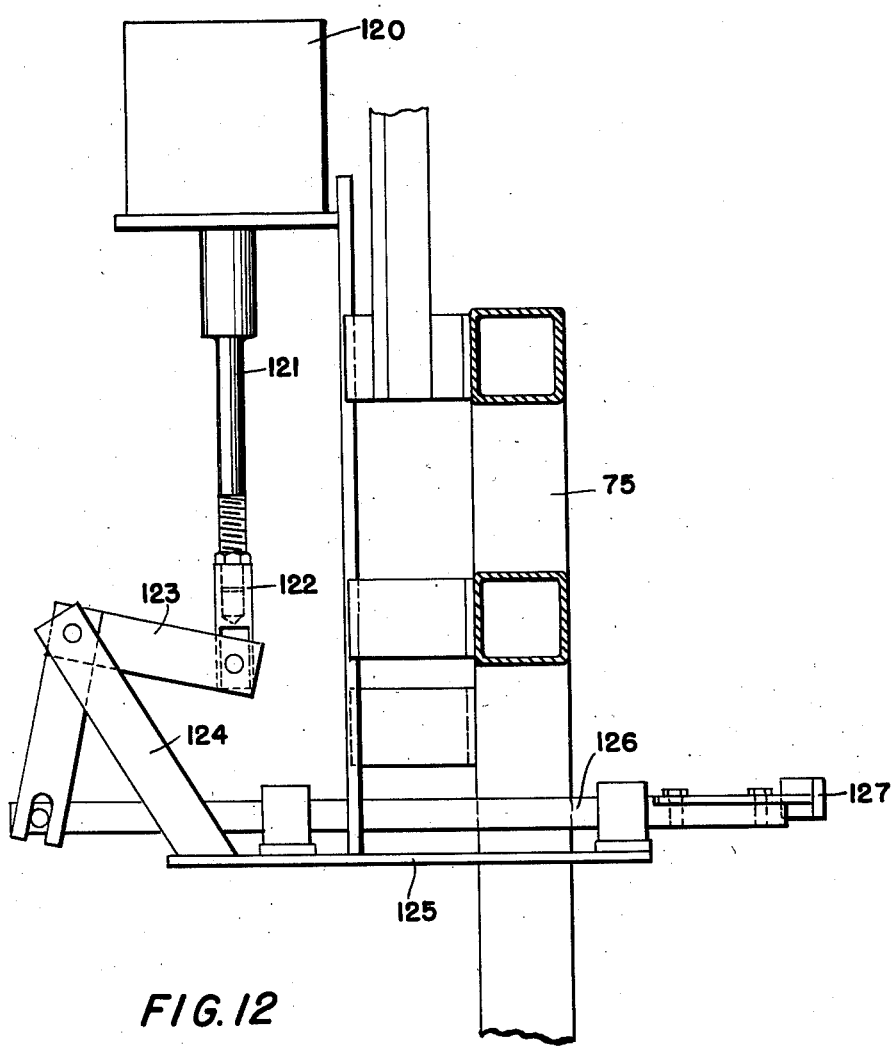
Fig. 12 is a side elevation of the solenoid-operated trip mechanism for the latch.

In order to limit this transverse removal to normal or small size ears only, means are provided for retracting the slides 93 whenever an over-sized ear passes under the feeler plate 50. Upward movement of the feeler plate 50 will close the circuit to the switch 71, and this circuit may then be used to retract the slide 93, so that it will pass across the conveyor 22 above the plane occupied by the over-sized ear. This unlatching of the slide 93 is accomplished by energizing a pull-up solenoid 120, shown on Fig. 12 to be mounted on frame 75. The plunger 121 of the solenoid has a yoke 122 linked to a bell crank 123. The bell crank is mounted on a bracket 124 on a platform 125, fixed to the forward part of the cross frame 75.

A shuttle bar 126 is journaled slidably on the platform 125 and capable of being pushed forward into the path of movement of the shoe 115 on the latch 108. A shoe 127 is attached to the forward end of the shuttle bar 126. When the plunger 121 is drawn up into the solenoid, the shuttle bar 126 is advanced, bringing shoe 127 into the path of the angularly projecting shoe 115. As the shoe 115 wipes past the shoe 127, it is moved into the position shown in dotted lines in Fig. 15. This releases latch 110 from opening 111, and the slide 93 is retracted by the spring 97.

This is the operation by which the slide 93 is prevented from engaging the oversized ear of corn.

Figure 9:
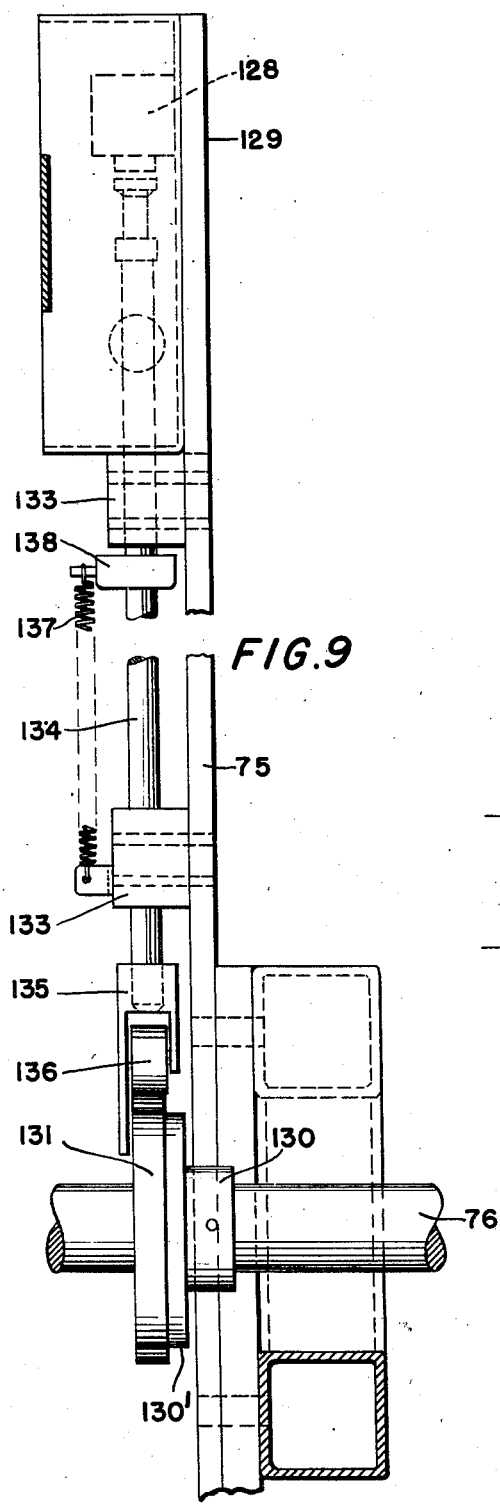
Fig. 9 is a side elevation of cam timing-switch.
Figure 11:
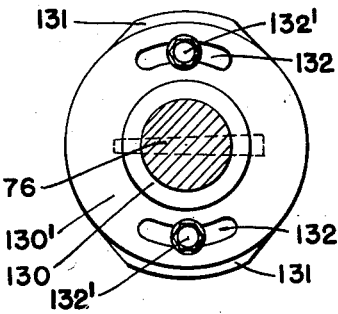
Fig. 11 is a detail side view of disk and cam.

The appropriate timing for the operation of the plunger 121 is effected by providing a timing switch 128 in the electric circuit. Referring to Figs. 9, 10 and 11, a switch box 129 is mounted on the rear side of the cross frame 75 above the drive shaft 76. The switch box contains the switch 128 which is similar to switch 71.

Driven shaft 76 has a rigidly fastened collar 130. This collar has a disk 130'. A cam plate 131 is adjustably mounted on the disk 130'. The disk has two arcuate slots 132, 132 through which bolts 132', 132' project from the cam 131. The cam 131 is adjustable circumferentially by movement of the bolts 132' in the slots 132, after which the cam may be tightened in place.

Above the shaft 76, the cross frame 75 has two bearings 133, 133 in vertical alignment. These carry a slidable rod 134. The lower end of the rod 134 has a yoke 135, in which is journaled a roller 136. The roller 136 rests upon the face of the cam 131.

A spring 137 is attached at one end to the lower bearing 133 and at the upper end fastened to a fixed collar 138 on the rod. In this way the rod is held firmly in engagement on the cam.

The upper end of the rod 134 extends into the switch box 129. It there terminates in an adjustable tappet 134' by which the customary switch 128 is actuated.

Figure 16:
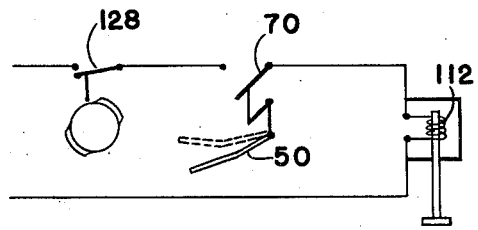
Fig. 16 is a wiring diagram of the electric circuits.

By adjusting the position of the cam, the timing of the switch 128 (Fig. 16) is adjusted relative to the trip shaft 76 and consequently synchronized with the approach of the shoe 115 on the latch to the shoe 127 by which it is tripped.

An endless conveyor chain 139 is carried in the bottom of a trough 140 (Fig. 2), which lies under the straight portions 119, 119 (Fig. 6) of the lower course of travel of the cross conveyor.

The retraction of slide 93 through the operation of the trip occurs as soon as the small sized ear has been delivered to the conveyor chain 139, and before there can be a further up-ending of the ear. Thus the ear is left on the conveyor chain 139 for suitable delivery to the corn cutting machine 73.

A similar conveyor chain 141 lies in the bottom of a trough 142 transversely disposed beyond the delivery end of the conveyor 22. Oversized ears which have been detected by the plate 50 and allowed to pass the cross conveyor, are delivered ultimately into the trough 142 and carried by the conveyor chain 141 to the cutting machine for oversized ears.

At the exit end of the lower course of travel for the cross conveyor, the side frame 75 carries a bar 143. A trip 144 is carried on the end of the bar 143 and in the path of the shoe 115 on the latch 108. In this way all slides 93 are lifted after they have passed into the straight track 119 beyond conveyor 22.

It will be evident that husked ears of corn are fed indiscriminately over the advancing roller conveyor and manually distributed so that one ear lies in the trough between each pair of rollers on the conveyor.

The ears are then advanced beneath the spray 24. At the same time the rollers 33 are caused to rotate by friction with the tracks 45. This will rotate the ears of corn so that they will be cleaned by the spray.

The ears are then advanced over the work station 25 where they may be inspected and culled. On the latter part of the travel in this area, the rollers are again rotated by travelling over the treads 46, thus affording a further opportunity for inspection. This step is followed by a second spraying operation in the spray equipment 26.

The ears then pass under the feeler plate 50. Small ears 48 do not lift the plate 50. Consequently each small ear is engaged by a slide 93 travelling along the lower course of the traversing conveyor. Slide 93 pushes the small ear onto the conveyor chain 139. Before the ear is pushed along the conveyor 139 and to avoid up-ending the ear, the slide 93 is then raised out of contact by the operation of the trip 144.

The oversize ears 46, 47 will lift the plate 50 and thus advance the member 127 into the path of the latch member 115, causing retraction of the slide 93 before it is brought opposite the large ear on the roller conveyor. This permits the large ear to remain on the roller conveyor until it reaches the end of the latter and is delivered to the chain conveyor 141 and the appropriate cutting machine 74.

In this manner the ears of green corn are successively sprayed, presented for manual inspection, again sprayed and finally assorted according to diameter for mechanical delivery to cutting machines appropirate for the several sizes of ears.

The preferred form of the invention has been described by way of example. However, many changes may be made in specific details and proportions without departing from the invention as defined in the following claims.

What I claim is:

1. A machine for handling husked ears of green corn and the like comprising a horizontal runway, an endless roller conveyer extending longitudinally over the runway, a rock-shaft journaled transversely above the conveyer, a feeler plate carried by the shaft, a switch closed by the upward movement of the plate, a transverse endless conveyer above the roller conveyer beyond the feeler plate, laterally disposed tracks at spaced intervals on said transverse conveyer, a fixed ramp located parallel to and adjacent the transverse conveyer, slides carried by the laterally disposed tracks for outward extension of the slides to sweep over the roller conveyer and switch operated means for retracting a slide on actuation by the vertical deflection of the feeler plate by an oversize ear.

2. A machine for handling husked ears of green corn and the like comprising a horizontal runway, an endless roller conveyer extending longitudinally over the runway, a rock-shaft journaled transversely above the conveyer, a feeler plate carried by the shaft, a switch closed by the upward movement of the plate, a transverse endless conveyer above the roller conveyer beyond the feeler plate, crossbars on the transverse conveyer, pusher units slidable on the said bars, parallel fixed guides forming a diagonal track for the pusher units to advance the latter with the roller conveyer, said pusher units having slides, a spring on each unit connected to the slide for holding the slide retracted, a fixed ramp parallel to and adjacent the transverse conveyer for advancing the slide outwardly, a latch for holding the slide in advanced position and switch operated means for releasing the latch on actuation by the vertical deflection of the feeler plate by an oversize ear.

3. A machine for handling husked ears of green corn and the like comprising a horizontal runway, and endless roller conveyer extending longitudinally over the runway, a rock-shaft journaled transversely above the conveyer, a feeler plate carried by the shaft, a switch closed by the upward movement of the plate, a transverse endless conveyer above the roller conveyer beyond the feeler plate, crossbars on the transverse conveyer, pusher units slidable on the said bars, parallel fixed guides beneath the transverse conveyer forming a diagonal track for advancing the pusher units with the roller conveyer, said pusher units having slides, a spring on each unit for holding the slide retracted, a fixed ramp between the lower and upper courses of the transverse conveyer for advancing the slide outwardly during travel of the pusher unit over the upper course of the conveyer, a latch for holding the slide in advanced position, and switch operated means for releasing the latch during travel of the unit over the said lower course and following the vertical deflection of the feeler plate by an oversize ear.

4. A machine for handling husked ears of green corn and the like comprising a horizontal runway, an endless roller conveyer extending longitudinally over the runway, a rock-shaft journaled transversely above the conveyer, a feeler plate carried by the shaft, a switch closed by the upward movement of the plate, a transverse endless conveyer above the roller conveyer beyond the feeler plate, crossbars on the transverse conveyer, pusher units slidable on the said bars, parallel fixed guides beneath the transverse conveyer forming a diagonal track for advancing the pusher units with the roller conveyer, a second pair of parallel fixed guides above the transverse conveyer forming a diagonal rearwardly directed track for the pusher units, a slide on each pusher unit, a spring on each unit for holding the slide retracted, a fixed ramp between the lower and upper courses of the transverse conveyer for advancing the slide outwardly during travel of the pusher unit over the upper course of the conveyer, a latch for holding the slide in advanced position, and switch operated means for releasing the latch during travel of the unit over the said lower course and following the vertical deflection of the feeler plate by an over size ear.

5. A machine for handling husked ears of green corn and the like comprising a horizontal runway, an endless roller conveyer extending longitudinally over the runway, a rock-shaft journaled transversely above the conveyer, a feeler plate carried by the shaft, a switch closed by the upward movement of the plate, conveying means extending transversely above the roller conveyor beyond the feeler plate, pusher units carried by the conveying means, said pusher units each having a slide, a spring on each unit for holding the slide retracted, a fixed ramp for advancing the slide outwardly, a latch for holding the slide in advanced position, a shoe slidable into the path of the latch on its travel through the lower course of the transverse conveying means and switch operating means for sliding the shoe into the path of the latch and lifting the slide following the vertical deflection of the feeler plate by an oversize ear.

References Cited in the file of this patent

UNITED STATES PATENTS

| | | |
|---|---|---|
| 1,872,903 | Cutter | Aug. 23, 1932 |
| 2,218,466 | Gray | Oct. 15, 1940 |
| 2,231,435 | Christian | Feb. 11, 1941 |
| 2,296,645 | Marsden | Sept. 22, 1942 |
| 2,387,709 | Ashlock | Oct. 30, 1945 |
| 2,552,620 | Christian | May 15, 1951 |